(12) United States Patent
Burg

(10) Patent No.: US 7,088,810 B1
(45) Date of Patent: Aug. 8, 2006

(54) CALLER ORIGINATED MULTIPLE CALLING

(75) Inventor: Frederick Murray Burg, West Long Branch, NJ (US)

(73) Assignee: AT&T Corp., New York, NY (US)

( * ) Notice: Subject to any disclaimer, the term of this patent is extended or adjusted under 35 U.S.C. 154(b) by 44 days.

(21) Appl. No.: 10/812,617

(22) Filed: Mar. 30, 2004

(51) Int. Cl.
*H04M 3/42* (2006.01)

(52) U.S. Cl. .................... 379/201.02; 379/201.05; 379/211.01; 379/211.02

(58) Field of Classification Search ......... 379/201.01, 379/201.02, 201.05, 211.01, 211.02, 211.03
See application file for complete search history.

(56) References Cited

U.S. PATENT DOCUMENTS

| | | | |
|---|---|---|---|
| 5,329,578 A | 7/1994 | Brennan et al. | |
| 5,384,831 A | 1/1995 | Creswell et al. | |
| 5,487,111 A | 1/1996 | Slusky | |
| 5,602,908 A | 2/1997 | Fan | |
| 5,946,380 A | 8/1999 | Cohen et al. | |
| 6,069,946 A | 5/2000 | Lieuwen | |
| 6,072,867 A | 6/2000 | Lieuwen | |
| 6,477,246 B1 | 11/2002 | Dolan et al. | |
| 6,754,325 B1* | 6/2004 | Silver et al. | 379/211.02 |
| 2002/0122546 A1 | 9/2002 | Brogne et al. | |
| 2002/0196918 A1 | 12/2002 | Culli et al. | |

* cited by examiner

*Primary Examiner*—Bing Q. Bui

(57) ABSTRACT

The present invention relates generally to a calling party initiated call in a communication system. More particularly, the invention encompasses a method and an apparatus for subscriber or caller originated multiple calling to one or more individuals at a plurality of addresses. The invention further includes the transfer of the control of the call back to the subscriber or calling party in the event that the called party was not available.

9 Claims, 2 Drawing Sheets

300

| | 310 | | 320 | | | 330 | |
|---|---|---|---|---|---|---|---|
| | PERSON I | | PERSON II | | | PERSON III | |
| | 312 | 314 | 322 | 324 | 326 | 332 | 334 |
| | DAY | NIGHT | LOC. 1 | LOC. 2 | LOC. 3 | WORK | HOME |
| | A | B | C | D | E | F | G |
| | H | A | J | K | C | G | F |
| | B | H | D | J | D | ° | ° |
| | M | ° | K | C | ° | ° | ° |
| | ° | ° | E | E | ° | ° | ° |
| | ° | ° | ° | ° | ° | ° | ° |
| | ° | ° | ° | ° | ° | ° | ° |
| | 316 | 318 | 323 | 325 | 327 | 336 | 338 |

*FIG. 3*

| PERSON I | | PERSON II | | | PERSON III | |
|---|---|---|---|---|---|---|
| DAY | NIGHT | LOC. 1 | LOC. 2 | LOC. 3 | WORK | HOME |
| A | B | C | D | E | F | G |
| H | A | J | K | C | G | F |
| B | H | D | J | D | ○ | ○ |
| M | ○ | K | C | ○ | ○ | ○ |
| ○ | ○ | E | E | ○ | ○ | ○ |
| ○ | ○ | ○ | ○ | ○ | ○ | ○ |
| ○ | ○ | ○ | ○ | ○ | ○ | ○ |
| ○ | ○ | ○ | ○ | ○ | ○ | ○ |

CALLER ORIGINATED MULTIPLE CALLING

FIELD OF THE INVENTION

The present invention relates generally to a calling party initiated call in a communication system. More particularly, the invention encompasses a method and an apparatus for subscriber or caller originated multiple calling to one or more individuals at a plurality of addresses. The invention further includes the transfer of the control of the call back to the subscriber or calling party in the event that the called party was not available.

BACKGROUND INFORMATION

The telecommunication industry uses different types of communication means to allow communication between people. For example, a person using a telephone to communicate with another person will typically pick up a handset of a telephone and dial a phone number to reach the other person. If the called person is available to take the call then the called person would pick up the handset of their telephone and a telecommunication channel or link would be established between the calling party and the called party. However, there are times when the called party may not be available or may not want to answer the call. Then in those situations a telephone just rings until the calling party hangs up or the communication link is automatically transferred, such as into a voice mail system or an answering machine, or is even forwarded to another number. In any of these cases the called party controls the call once the connection has been made. This wastes a lot of time. Not only that but the calling party may not want to leave a voice message and may not want the call forwarded to an unknown entity or person or location.

The prior art has handled some of these problems in a number of way. For example, U.S. Pat. No. 5,384,831 (Creswell et al.), describes a system for providing personal telecommunications services to a subscriber (i.e., the called party) wherein the subscriber may associate different call identifiers with different specifications which define respective call treatments. Creswell's system allows individual subscribers (i.e., the called party) to customize their incoming call treatment, for example, forwarding a telephone call associated with a call identifier to one of a number of different destinations. Similarly, U.S. Pat. No. 5,329,578 (Brennan et al.) describes a so-called personal communication service (hereinafter "PCS") where calls to a personal number are routed to a PCS service node, which manages the communications services for all subscribers, i.e., called parties. Brennan's PCS governs how attempts to communicate with a called party are handled with appropriate considerations, for example, for who is calling, when the call is made, and the urgency of a particular call. Brennan's system provides the called party with personal control over the way in which the system will operate in completing individual calls made to them from calling parties. Further, Brennan's system provides a so-called "hunting" feature which attempts to contact the called party at a sequence of likely locations which were previously defined by the called party and stored in the system. Upon receiving an incoming call for a particular called party, Brennan's system will attempt to complete the call to the called party by "hunting" through the previously stored list of contact locations.

The prior art is replete with telecommunications systems typified by the technology of the above-described systems where the called party is provided various customized options and a level of control as to how that called party may be reached via various communication devices (and the associated contact numbers therewith) used with various services to which that called party subscribes, i.e., wired telephone, cellular telephone, facsimile, pager, etc. Of course, the primary advantage of such prior art systems is the fact that the called party controls and prescribes the treatment of incoming calls to a particular contact number and how that call may be routed to the plethora of communications devices at any one time in an effort to reach that party. This called party control feature, although very advantageous, does present certain obstacles to the calling party attempting to reach a particular called party. For instance, the calling party to such systems is routed in accordance with the called party's previously defined routing sequence and is usually prevented from interactively participating in the routing sequence. That is, the calling party has no control or input as to the routing of a call to the called party in such a system. Thus, if the incoming call from the calling party, for example, is routed to a particular device to which an answering machine is connected, this device will allow for call completion but leaves the calling party with the only option of leaving a message and not actually completing his desired action of speaking with the called partly directly. Further problems arise for the calling party, for example, when the incoming call is completed but is answered not by the called party but by the another person, e.g., the called party's administrative assistant. Again, the call is completed but the calling party's desired result of actual contact with the called party is defeated.

One known arrangement which addresses the above-described dilemmas of called party controlled telecommunications systems is described in U.S. Pat. No. 5,487,111 (R. D. Slusky), the disclosure of which is incorporated herein by reference. Slusky describes an enhancement in telecommunications systems employing so-called "sequence calling." Sequence calling is a telecommunications service feature which allows a telephone service subscriber to specify to the telecommunications infrastructure, e.g., an inter-exchange network, a sequence of telephone numbers to which a call to the subscriber, i.e., called party, can be routed until the subscriber is "found." For example, the called party may have a personal telephone number of the like associated, for example, with the so-called personal EasyReach, 700 service available from AT&T Corp. Thus, a subscriber to a "700" telephone number is able to specify that a call to that personal number should be routed, for example, first to the subscriber's office telephone and then, if no answer there, to the subscriber's cellular telephone number and, if no answer there, to the subscriber's home telephone. Significantly, Slusky's system addresses the situation where a call to one of the previously defined contact telephone numbers is actually answered by someone other than the subscriber. That is, the calling party to the subscriber's "700" telephone number is presented, for example, a recorded announcement by the telecommunications system that the subscriber, i.e., the called party, has designated a list of telephone numbers to which the incoming "700" call will be routed in sequence in order to reach the called party. The calling party is told that he may cause the call to proceed to the next number in the designated sequence at almost any point in time even if the call is completed to a particular one of the telephone numbers in the sequence. However, the calling party must proceed in the call completion sequence through the telephone numbers as previously designated by the called party.

Further, the calling party has no input into the contact information used by the system to route their call to the called party.

Another approach for solving this problem has been discussed in U.S. Pat. No. 6,069,946 (Lieuwen), the disclosure of which is incorporated herein by reference, which provides a technique for calling party definition and control of the contact information and sequencing used to reach a particular called party. In this known prior art, the calling party specifies a set of devices along with their respective contact numbers for use in contacting a particular called party. Thereafter, the service will attempt to locate the called party in accordance with the designated set of communications devices and respective contact numbers so designated by the calling party.

Yet another approach for solving this problem has been discussed in U.S. Pat. No. 6,072,867 (Lieuwen), the disclosure of which is incorporated herein by reference, which provides a method and apparatus for calling party definition and control of the contact information and sequencing used to reach a particular called party. In this known prior art, the calling party specifies a set of devices along with their respective contact numbers for use in contacting a particular called party. Thereafter, attempts are made to contact the called party in accordance with the designated set of communications devices and respective contact numbers so designated by the calling party.

Thus, there exists a need to provide a calling party with increased control over the call sequencing process used, for example, in a telecommunications system, to contact a called party at a variety of communications devices and at a variety of contact locations and/or addresses and/or numbers. This invention overcomes the problems of the prior art. The invention provides the calling party the option of planning and controlling the call without wasting valuable time. More particularly, the invention encompasses a method and an apparatus for caller originated multiple calling, which further includes the transfer of the control of the call back to the calling party in the event that a communication link was unable to be established between the calling party and the called party and/or prompts the calling party to exercise other options to reach a desired called party.

PURPOSES AND SUMMARY OF THE INVENTION

The invention is a novel method and an apparatus for caller or subscriber originated multiple calling in a communication network.

Therefore, one purpose of this invention is to provide caller or subscriber originated multiple calling, which further includes the transfer of the control of the call back to the calling party in the event that a communication link was unable to be established between the calling party and the called party.

Another purpose of this invention is to provide a calling party or a subscriber with a control over a second communication link in the event that a first communication link did not serve the intended purpose of the calling party.

Yet another purpose of this invention is to allow a calling party or subscriber to provide a plurality of call preferences at the initiation of the call, and wherein the calling party may utilize a first communication device to locate the called party at a second communication device, and wherein the second communication device is one of the communication devices selected during the initiation of the call.

Therefore, in one aspect this invention comprises a method for allowing a subscriber or calling party to control a call to a called party, comprising the steps of:

(a) receiving a plurality of call preferences from said subscriber or calling party using a first communication device to contact a called party having a second communication device;

(b) processing said call through at least one call control entity (CCE); and (c) monitoring said plurality of call preferences by said CCE.

In another aspect this invention comprises a program storage device readable by machine, tangibly embodying a program of instructions executable by the machine to perform method steps for allowing a subscriber or calling party to control a call to a called party, the method steps comprising:

(a) providing a plurality of call preferences at the initiation of a call by said subscriber or calling party using a first communication device to contact a called party having a second communication device;

(b) processing said call through at least one call control entity (CCE); and (c) monitoring said plurality of call preferences by said CCE.

In yet another aspect this invention comprises a communication apparatus comprising at least one call control entity (CCE), said CCE having at least one means for processing a plurality of call preferences designated by a subscriber or calling party at the initiation of a call.

In still yet another aspect this invention comprises a communication apparatus comprising at least one call control entity (CCE), said CCE having at least one means for processing a plurality of call preferences designated by a subscriber or calling party, and at least one means for prompting said calling party to provide another call preference for said call in the event that said calling party is not in communication with said called party.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 3 is an exemplary table used to illustrate an embodiment of the present invention.

DETAILED DESCRIPTION

Figure 1:
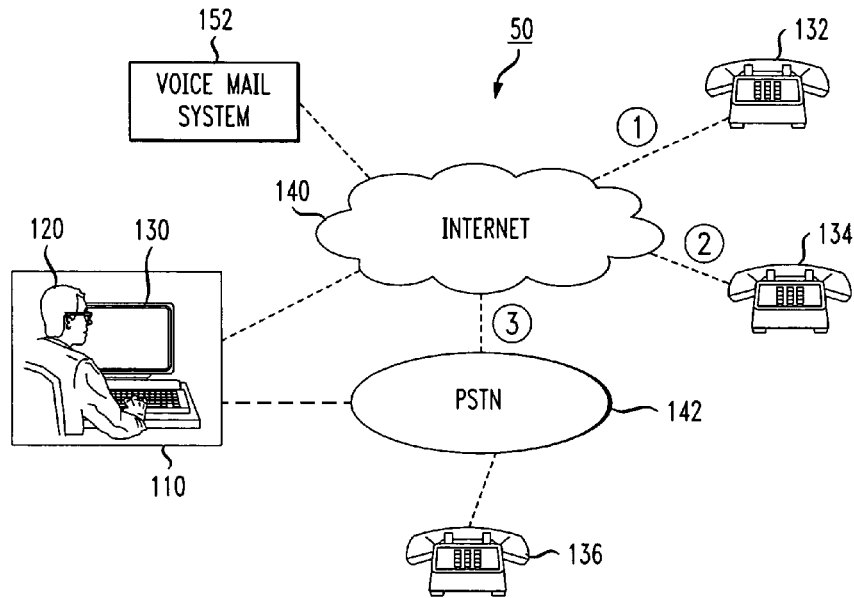
FIG. 1 is an exemplary communication network known in the art.

FIG. 1 is an exemplary communication network 50 known in the art. In the network 50 a subscriber or calling party 120 typically utilizes a communication device 130, in an environment or location 110, to initiate and complete a telephone call. The communication device 130 could be selected from a group comprising a computer, a PDA (Personal Digital Assistant), a cellular telephone, a telephone, a mobile phone, a customer premise equipment, a wired telephone, a PC (Personal Computer), a pager, a facsimile machine, to name a few.

In the network 50 the call initiated at location 110 can be directed into an Internet 140 or to a PSTN (Public Switching Telephone Network) 142 before it is routed to another communication device, such as, communication device 132, 134 or 136. For example, the calling parting 120 might be calling the called party at the communication device 136, such as, a telephone 136, but the called party may have decided not to pick up the call and thus the call being received at telephone 136 would just ring and there would be no connection of the call. On the other hand the called party at telephone 136 could have programmed the telephone 136 to forward the call to another communication device, such as, communication device 132 or 134. Similarly, the called party at telephone 136 could have programmed the telephone 136 to forward the call to another communication device, such as, a voice mail system or a recording device 152, which could be at another alternate location.

In the above example, if the call is forwarded to a voice mail then the calling party 120 may end up leaving an unnecessary message or may just hang up after hearing the announcement message. However, if the call is forwarded to another person or location, then in that event the calling party 120 may or may not want to talk to that person, or may or may not want to leave a message at the alternate communication location.

Thus, as one can see, a call made by a calling party 120 may not complete to the intended called party. And, in each of such cases, the called party may have expressed preferences for how to handle the call, for example, voice mail, call-forwarding, termination of a call after a set number of rings, to name a few, which the calling party 120 has no control over. Furthermore, the calling party 120 may end up leaving an unnecessary message, talking to a party at a forwarded number who is not the desired called party, hanging up and redialing a new number, to name a few options.

However, the calling party 120 may have preferences as to how the call should be handled which may be different than those of the called party. Thus, the method and the apparatus of the prior art may save time and expense for the called party but it may not serve the purpose for the calling party 120.

This invention overcomes the identified prior art problems. This invention also saves the calling party 120 from leaving unnecessary messages or having to hang up and redial additional numbers, or talking to a party other than the desired called party, etc.

Figure 2:
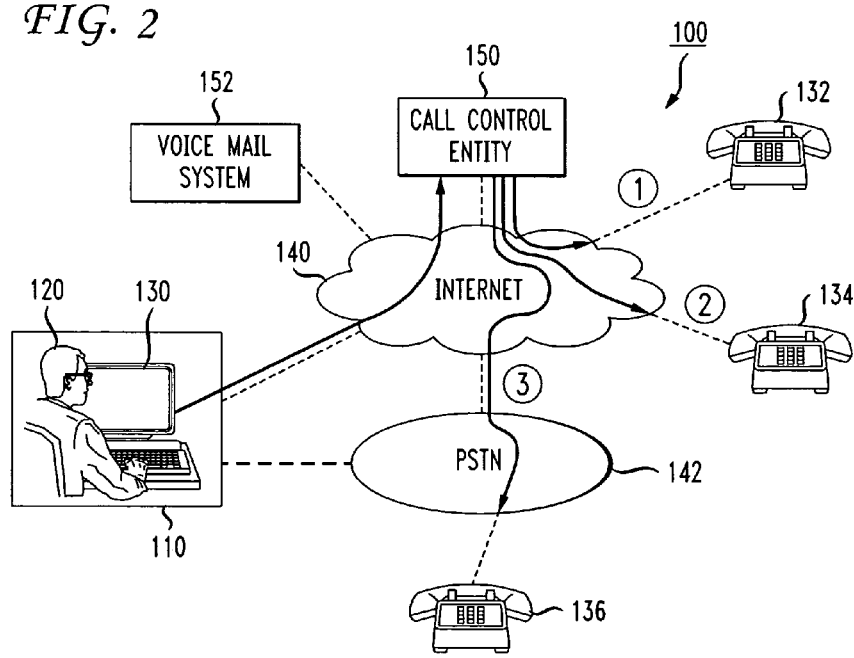
FIG. 2 is an exemplary communication network which is used to illustrate the present invention.

FIG. 2 is an exemplary communication network 100 which is used to illustrate the present invention. The network is similar to the network 50 discussed with reference to FIG. 1, but the network 100 has one additional device 150. The device 150 is a call control entity (CCE) 150. For the ease of understanding, only one CCE 150 is shown, however, the network 100 could have a plurality of CCE's 150. Additionally, the CCE 150 could be a stand alone device or it could be integrated with or associated with another device within the network 100.

The calling party 120, using the communication device 130, such as a computer terminal 130, would place a call. However, using this invention, the calling party 120 would express an ordered set of preferences for completing the call. The call would be routed by methods and apparatuses that are well known in the art, except that the placed call would also go through the call control entity (CCE) 150 that will process and complete the call.

Using this invention the CCE 150 attempts to first contact the called party at a first identified address/number. If the called party is not available, the CCE 150 will then try the next address/number provided by the calling party 120. This could be attempted by the same CCE 150 or a different CCE (not shown). However, it should be appreciated that any additional CCE's 150 have to work in conjunction with the first CCE 150.

In another embodiment, with this invention, the calling party 120 could place the call, for example with a plurality of telephone numbers along with a set of criteria, such as, if the first called party does not answer, say in 5 rings, to terminate the first call, and to dial the second designated number/address, and so on and so forth, until the first called party is reached.

In yet another embodiment of this invention, the calling party 120 may wish to contact a specific person in a multi-person household. However, if the specific person tried is not available, then as in the prior art system the called party may have set their communication device to forward the call to a voice mail. In that case the calling party 120 then has to hang up or perhaps leave a message in the voice mail, for example, that they will try to contact the called party's spouse, and then redial another number to contact the first party's spouse, etc. With this invention the calling party 120 could place the call with a plurality of telephone numbers along with a set of criteria, such as, if the first person called did not answer, say in 5 rings, to terminate the first call, and to dial the second designated number for the first party's spouse, and so on and so forth.

Another way to implement this invention would be using an Interactive Voice Response (IVR) system, where the IVR system would prompt the calling party for a number/address.

Still yet another embodiment of this invention could allow the calling party to use some of the features that may already be available in the existing PSTN system to practice this invention. In this embodiment, for example, the calling party could dial a special phone number or contact address that is associated with this invention and then either:

(a) enter a set of phone numbers to identify the called party with each number being terminated with a special character on the dial-pad, such as, for example, the "#" symbol, the "*" symbol, to name a few; or (b) interact with an Interactive Voice Response (IVR) system that would prompt the calling party to enter each phone number associated with the called party. The IVR could recognize the end of one phone number or address to prompt for a successive phone number or address. This could be done in a number of ways, for example, one way could be by counting the digits of the entered phone number or address information; another way could be by using a timer to determine that the calling party is no longer entering digits or address and is waiting for a prompt; yet another way could be a special character or feature which would allow the IVR to recognize the end of a character string.

There are also many other ways to implement this invention, for example, one way to implement this invention would be to use, for example, the "#" feature on the communication device. This would be similar to the #-recall feature used with, for example, AT&T's calling cards, where one can enter the "#" symbol on the telephone keypad after finishing a call and then entering another phone number without having to re-enter the subscriber's AT&T calling card number. Here in this invention when the called party does not answer, in say 3 rings, the CCE would terminate the first attempt to reach the called party and prompt the user or calling party for the next option. The calling party would then either enter a new address/number or select a number/address or a sequence of numbers/addresses from a list of previously stored numbers/addresses. This embodiment of the invention could also be implemented using a special designated number or address, such as, for example, 1-800-CALLATT (1-800-225-5288) or "WWW.ATT.COM". However, if a PC or a PDA or similar such device is being used, then the invention could use other prompting features/characters for sequencing other or additional address(es)/number(s).

Another way to implement this invention would be to allow the calling party to use a pointer device, such as a mouse, to select the sequence of contact numbers/addresses prior to the initiation of the call and the system would then follow the sequence until the desired called party is reached. Even with this sequence calling plan, the calling party still has control of the call as the CCE would be issuing a prompt to the calling party prior to the initiation of the next call. This way the calling party is fully aware of the contact number/address that the CCE is trying and the calling party can interject at any point to define or redefine the calling sequence or the caller selection or grouping list.

This invention could also be implemented in a variety of other ways, such as, for example using modern Internet protocols relating to VoIP (Voice over Internet Protocol), for example, SIP. As stated earlier, the calling party 120 could specify several alternate destinations to complete the call. This would preferably be done by the calling party 120 at the initiation of the call. The protocol message could also contain the identities of these destinations. Thus with only one call attempt, a plurality of calls would be placed using the CCE 150, or a similar such device 150.

As one can see, this invention gives the control of the call to the calling party 120. Additionally, this invention allows a calling party 120 to specify preferences for completing a call by utilizing (a) a call setup message containing alternate destinations for completing a call via a communication device, such as a computer 130, and/or (b) a Call Control Entity 150 that attempts to complete the call in the order of the preferences expressed by the calling party 120.

FIG. 3 is an exemplary table 300 used to illustrate an embodiment of the present invention. Table 300 shows a first person 310, having a sequence of day contact numbers/addresses 312 and a sequence of night contact numbers/addresses 314. The day sequence 312 comprises of communication device numbers/addresses 316, identified as A, H, B, M, etc.; and the night sequence 314 comprises of communication device numbers/addresses 318, identified as B, A, H, etc. Similarly, a second person 320 has a sequence of location 1 contact numbers/addresses 322, a sequence of location 2 contact numbers/addresses 324, and a sequence of location 3 contact numbers/addresses 326. The location 1 sequence 322 comprises of communication device numbers/addresses 323, identified as C, J, D, K, E, etc.; location 2 sequence 324 comprises of communication device numbers/addresses 325, identified as D, K, J, C, E, etc.; and location 3 sequence 326 comprises of communication device numbers/addresses 327, identified as E, C, D, etc. Similarly, a third person 330 has a sequence of work location contact numbers/addresses 332, and a sequence of home location contact numbers/addresses 334. The work location sequence 332 comprises of communication device numbers/addresses 336, identified as F, G, etc.; and the home location sequence 334 comprises of communication device numbers/addresses 338, identified as G, F, etc.

Using table 300 as an example, the calling party could use any combination or sequence to contact any called party identified in the table 300 (i.e., person I, person II, or person III) and at any respective set of locations identified in table 300 associated with the called party. For example, using this invention, the calling party could identify person 310 as the called party and could use the "Day" sequence to contact the called party.

Another example could be a situation where say the calling party wants to contact person I, but if person I is, for example, not available, then try person II. Using table 300, the calling party may want to set-up the call as A, H and D, such that the sequence of the addresses/numbers to be used for contacting the called party would start with address/number A and end with address/number D. Stated another way, the invention allows for trying to reach person I at A and H, and then automatically abandon the sequence of numbers/addresses to reach person I and to automatically make attempts to reach person II at D.

In a preferred embodiment of the invention a calling party decides whom they want to contact. The calling party then picks up a series of locations, either all locations as a collection as part of launching the call to the CCE 150, or run through the locations in turn if one location fails. Basically, a calling party starts a call having in mind whom they want to call but not knowing what number(s)/address (es) to use. Failure to get person I at any of his/her numbers, using, for example, the "Day" sequence in the day time, could result in a decision to try person II at any of his/her numbers. Essentially, the calling party abandons attempts to reach person I at his/her sequence of number(s)/address(es) and may try person II at his/her sequence of number(s)/address(es). Another embodiment of the invention would be to allow the calling party to make further subdivisions or create several sequences for a particular called party—such as the "Day" vs "Night" sequence for person I as shown in FIG. 3.

Furthermore, one can also see from table 300 that the second person 320 has a plurality of locations where he might be available and also plurality of communication devices 323, 325, 327, etc. that can be used to contact the called party 320, and the calling party may or may not want to list all the contact addresses/numbers for each sequence location. This could be for a variety of reasons, such as, for example, the calling party may be aware that the second person 320, when at location 326, does not have access to all the communication devices, there may be toll charges associated when calling the additional contact locations/address associated with location 3, to name a few. Table 300 also illustrates that the third person 330 has only two locations and two communication devices that she uses in order for a calling party to reach her. Also illustrated in Table 300 is that the first person 310 has a communication device 316, identified as M, which is only active or available for the purposes of communication during the day.

As mentioned elsewhere in the specification, if a called party is not available at any of the pre-programmed or stored contact numbers/addresses, the calling party has the option of inputting a new number when prompted by the CCE 150.

Similarly, the calling party has the option of skipping a number/address when prompted by the CCE 150 in the event that the call did not go through at the attempted number/address or when the desired called party was not available at the previously attempted number/address. For example, the CCE 150 may indicate that the next number/address to be tried is "H" and ask that the subscriber or calling party enter "1" if "H" should be tried next or enter "2" to skip "H" and go to the next number in the list.

One advantage of this invention is that if the call succeeds then the calling party does not have to waste time inputting a sequence of numbers/addresses prior to the initiating of a call. Similarly, the calling party could sequence these numbers/addresses in a memory location, for example, for any future use or for the purposes of redialing, etc.

Another advantage of this invention is that the calling party also has the option of inputting one or more number/address prior to the call and still be in control of the call until the desired calling party is reached.

With this invention the calling party has the option of storing one or more numbers/addresses prior to the initiation of the call or to select them in the event that the first attempt to contact the calling party failed or to input them at any point prior to the contact with the desired called party. The numbers/addresses can be stored at any appropriate location, such as, on a PDA, a PC, a communication device, a network storage apparatus, to name a few.

Another advantage with this invention is that it allows the calling party to try a different sequence each time a called party is contacted and this would depend, for example, on the circumstances. For example, a different sequence of contact numbers/addresses would be used to reach a called party, say at 10 AM as opposed to trying to reach the same called party, say at 7 PM, or trying to reach the same called party when, say they are out of town.

As stated earlier, this invention could also be implemented in the PSTN (Public Switched Telephone Network) system. With the PSTN system, one could also use an IVR system to enter the list of numbers. It should also be appreciated that the above-mentioned use of SIP is meant to be illustrative; other Internet-based protocols could also be used to provide the same capability in order to implement this invention.

The use of Internet protocols for VoIP is standardized by the IETF. It should be remembered that SIP is an IETF RFC/standard. This invention may also result in the extensions to SIP or be an extension to whatever other protocol might be appropriate for VoIP.

This invention could also be used by consumer or local communication companies to enhance their local offering. This invention would also enhance current calling options offered by telecom companies to subscribers. This invention could also be used by businesses, for example, to enhance virtual IP PBX or IP Centrex offerings.

It is preferred that a PC or a PDA type device or terminal be used to enter the address/number of the called party. Similarly, a PC or a PDA type device or terminal can be used to send the call request with at least one number/address or a list of numbers/addresses. It should be appreciated that the call preferences could be selected from a group comprising: URL address(es), website address(es), email address(es), phone number(s), facsimile number(s), cellular number(s), pager number(s), to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for allowing a calling party to control a call to a called party, comprising the steps of:
    (a) receiving a plurality of call preferences, from said calling party using a first communication device, to contact a called party having a second communication device;
    (b) processing said call through at least one call control entity (CCE) that attempts to reach the called party at a first one of the plurality of call preferences, and
    (c) monitoring of call completion by said CCE; and, if completion is unsuccessful,
    (d) prompting of the calling party by the CCE for another call preference, selected from the received list of call preferences; and
    (e) repeating steps (c) and (d) until successful call completion or exhaustion of the plurality of call preferences.

2. The method according of claim 1, wherein said call preferences are selected from a group consisting of URL address, website address, email address, phone number, facsimile number, cellular number and pager number.

3. The method of claim 1, wherein said plurality of call preferences contains at least one alternative destination number/address for completing said call.

4. The method of claim 1, wherein said first communication device is selected from a group consisting of a computer, a PDA (Personal Digital Assistant), a cellular telephone, a telephone, a mobile phone, a customer premise equipment, a wired telephone, a PC (Personal Computer), a pager and a facsimile machine.

5. The method of claim 1, wherein said second communication device is selected from a group consisting of a computer, a PDA (Personal Digital Assistant), a cellular telephone, a telephone, a mobile phone, a customer premise equipment, a wired telephone a PC (Personal Computer), a pager and a facsimile machine.

6. The method of claim 1, wherein said plurality of call preferences created by said calling party are stored at a location selected from a group consisting of said first communication device, said CCE, a telephone exchange and the Internet.

7. The method of claim 1, wherein said CCE resides at a location selected from a group consisting of PBX, Centrex, PSTN, the Internet and said first communication device.

8. The method of claim 1, wherein said first communication device has at least one means to display the called party number/address.

9. The method of claim 1, wherein said first communication device has at least one means to display and select the call preferences.

* * * * *